United States Patent [19]

Sun et al.

[11] Patent Number: 4,649,519
[45] Date of Patent: Mar. 10, 1987

[54] SELF BIASING THERMAL MAGNETO-OPTIC MEDIUM

[75] Inventors: Shu S. Sun; Curt W. Laumann, both of Rochester, Minn.

[73] Assignee: International Business Machines Corporation, Armonk, N.Y.

[21] Appl. No.: 781,618

[22] Filed: Sep. 30, 1985

[51] Int. Cl.$^4$ .............................................. G11C 13/06
[52] U.S. Cl. ........................................ 365/122; 365/28
[58] Field of Search ................... 365/10, 27, 28, 122; 360/59, 131, 135; 369/13

[56] References Cited

U.S. PATENT DOCUMENTS

| | | | |
|---|---|---|---|
| 3,651,504 | 3/1972 | Goldberg et al. | 365/122 |
| 3,680,065 | 7/1972 | Almasi et al. | 365/122 |
| 3,702,993 | 11/1972 | Meuhaus et al. | 365/122 |
| 3,710,352 | 1/1973 | Smith et al. | 365/121 |
| 3,710,353 | 1/1973 | Jacobs et al. | 365/121 |
| 3,711,841 | 1/1973 | Geusic et al. | 365/28 |
| 3,739,394 | 6/1973 | Becker | 360/59 |
| 3,975,710 | 8/1976 | Watanabe et al. | 365/28 |
| 3,982,234 | 9/1976 | Voegeli | 365/32 |

Primary Examiner—James W. Moffitt
Attorney, Agent, or Firm—Bradley A. Forrest

[57] ABSTRACT

A layer in a magnetic storage medium provides a biasing magnetic field for writing data. The layer exhibits a net magnetization with an orientation in a first direction when the layer is at a temperature below its compensation temperature and a net magnetization with an orientation in a second direction different from the first direction when heated as by a laser to a temperature above its compensation temperature, but below its Curie point temperature.

29 Claims, 11 Drawing Figures

SELF BIASING THERMAL MAGNETO-OPTIC MEDIUM

INCORPORATION BY REFERENCE

Copending Patent Application entitled Erasable Self Biasing Thermal Magneto-Optic Medium (U.S. patent application No. 781,374 filed Sept. 30, 1985) assigned to the same assignee and filed on the same date as the present Application is hereby incorporated by reference.

BACKGROUND OF THE INVENTION

This invention relates to magneto-optic storage mediums and in particular to provision of a biasing field for obtaining desired magnetizations in a storage layer.

In many magneto-optical storage mediums, data is represented by a magnetized domain. The magnetization direction is perpendicular to the medium which is usually a very thin magnetic film. The data is read based on what is called the magneto-optical effect. Basically, the magneto-optical effect is the shift of polarization direction of a polarized light beam when it encounters a magnetized medium as a function of the direction of magnetization of the domain. The polarized light beam is commonly provided by a laser.

To obtain magnetized domains representative of data, a laser is commonly used to heat the magnetic medium in the area where such a domain is desired. The magnetization direction is changed by first heating the magnetized domain to a temperature above its Curie temperature which removes the magnetization. The heating process is then stopped, and a new magnetized domain representative of the desired data begins to form as the temperature begins to decrease. The new direction of magnetization depends on an applied external magnetic biasing field which forces the magnetization of the domain to conform to the direction of the external biasing field as the domain cools below its Curie point.

Several schemes have been used to generate the external magnetic biasing field in the past. U.S. Pat. No. 3,702,993 shows a printed wire which traces a tortuous path between discrete areas of the medium. The wire requires energization which must be controllably switched to obtain desired directions of magnetization of the domains. U.S. Pat. Nos. 3,651,504 and 3,739,394 use an external magnetic field producing coil to produce the biasing field.

Other means of providing a biasing field include the use of electric fields to obtain desired directions of magnetization of the domains in the medium. U.S. Pat. No. 3,710,352 shows the application of a low voltage polarizing potential across ferroelectric medium during cooling of selectively heated bit storage areas to change electrical polarization of the medium. The voltage source is indicated as an external battery. U.S. Pat. No. 3,710,353 shows a ferroelectric medium in contact with a thermal capacitive region. As the capacitive region is heated with the magnetic medium, a voltage transfer occurs from the thermal capacitive region to the magnetic region resulting in a net voltage across the magnetic region to cause electrical polarization reversal. An energy source for the electric bias field producing capacitive region is required. A switch is also required to provide different polarizations.

A further magnetic medium structure is disclosed in U.S. Pat. No. 3,680,065 in which the Curie point of the storage layer from which data is read, is near ambient room temperature. A second layer in physical contact with the storage layer has a higher Curie temperature and has the same magnetization as the storage layer, and serves to remagnetize the storage layer by quantum exchange coupling if the temperature of the storage layer happens to reach room temperature. The second layer is not used as a biasing field to obtain desired magnetized domains, but merely to retain magnetizations obtained by common techniques.

A primary problem with the above methods of applying biasing fields is that they require a switchable energy source. At the high data recording rates required by today's storage devices, switching the sources becomes a significant problem. It takes more time to switch the source of magnetization than it does for the laser beam to pass by the domain. Thus, when writing data, at least two passes are normally required to obtain desired magnetic orientations in the magnetic domains. Also, the high switching rates produce potentially harmful electromagnetic noise.

SUMMARY OF THE INVENTION

A magnetic field biasing layer for a storage device has temperature dependent magnetic properties. The layer has a net magnetization which changes in orientation as a function of temperature. It comprises two oppositely oriented magnetic material components. One material having this kind of magnetic property is known as a ferrimagnetic material. As the temperature of the biasing layer rises, the magnetization of both component materials decreases, but the rate of decrease is different. The net magnetization is the difference between the two component materials. At the compensation temperature, the magnetization of both materials are equal. Since they are oppositely directed, the net magnetization is zero. As the temperature increases past the compensation temperature, the orientation of the net magnetization changes direction because of the different rate of change of magnetization of the two component materials. Because of the change in direction of magnetization as a function of temperature, this layer can be used to bias a magnetic storage device to provide desired magnetic field orientations.

In one preferred embodiment, a self biasing magneto-optic storage medium has a first magnetic layer which retains desired magnetic field orientations representative of data in discrete domains of magnetization. A second magnetic layer as described above is coupled to the first magnetic layer and provides a biasing field for obtaining the desired magnetic field orientations in the first magnetic layer.

To record data in the storage medium, a portion of the first layer corresponding to a magnetic domain is heated from ambient temperature as by a laser to a temperature at or above its Curie temperature. The second layer is a ferrimagnetic biasing layer having a compensation temperature, and is heated by the same laser coincidental to the heating of the first layer. Prior to the heating of the layers, the direction of magnetizations of the domains in both layers is the same, for example, up.

When the domain of the first layer reaches its Curie point, its magnetization is essentially removed. The corresponding domain of the second layer is at a temperature above its compensation temperature and its net magnetization has attained a net down orientation which is opposite to its net magnetization at ambient temperature.

When the laser is turned off, the layers begin to cool. The temperature of the first layer passes back down through its Curie point and the magnetization of the heated domain conforms to that of the second layer proximate to it, which is oriented down. As the cooling continues, the second layer passes through its compensation temperature after which its net orientation is up. The coercivity of the second layer is small enough to be influenced by the magnetization projected from the first layer and thus its net magnetization is flipped to the down direction also. When ambient temperature is reached, the first and second layers are both magnetized in the down direction. A flip flop of the domain has occurred in both the first and second layers where they have been heated.

To change the orientation of the domains back to up, the domain is heated again to a temperature about the Curie point of the first layer. At this point, the net direction of magnetization of the second layer is now oriented in the up direction. As cooling occurs, the first layer is influenced by the second layer to be magnetized in the up direction. As further cooling occurs past the compensation temperature, again, the coercivity of the second layer becomes low enough for the net magnetization to be changed to the up direction. At ambient temperature, both the first and the second layers are again magnetized in the up direction.

This flip-flopping of directions of magnetization of domains is enabled by the biasing field integral to the storage medium. No external source of biasing is required as in the past.

A focused laser beam is preferably used to obtain very small domains of magnetization in the medium. The small domains are detected by a beam reflected from the materials and originating from the same laser used to create them. The polarization shift of the beam caused by the magnetization of the materials during the travel path of the beam indicates the magnetization of the domain. This polarization shift is referred to as the Kerr rotation angle. At ambient temperature, the temperature at which data is read, the magnetization of both layers are oriented in the same direction. Increased Kerr rotation angle from the second layer can make detection of the magnetic orientation of the domain easier than polarization shift caused by a single layer depending on the thickness and spacing of the layers.

The provision of an integral biasing field means that smaller magnetic field sources are required because the distance from the source of the field and the storage layer is small. The externally produced fields of prior devices needed to traverse larger distances and hence required more energy to obtain, which lead to slower switching times. The present invention utilizes the heat of the laser to switch the bias field. Having thin film layers and high intensity heat from the focused laser beam results in faster changing of magnetizations than available in prior devices.

In a further preferred embodiment, a third layer of magnetization below the second layer is provided. The third layer has a magnetization which has a predetermined orientation. When the first and second layers are heated above their respective Curie points, the third layer causes the magnetization of the first and second layers to orient in the same direction as the orientation of the third layer. The temperature dependent magnetic properties of the third layer are selected such that the projected magnetization is significant when heated coincident to heating of the first and second layers. Thus, all domains may be returned to a selected magnetic orientation without regard to each domains' initial magnetic orientation.

DETAILED DESCRIPTION OF THE INVENTION

Figure 1:
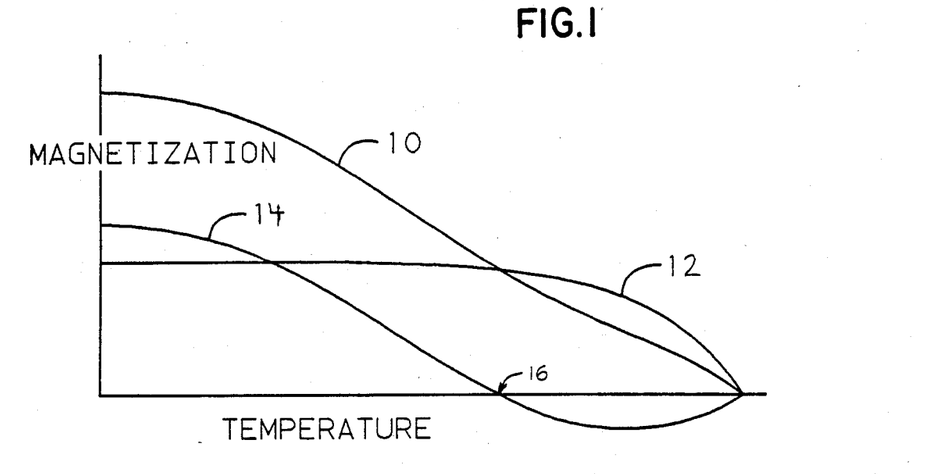
FIG. 1 is a graph of magnetization characteristics of a magnetic field biasing layer with respect to temperature.

In FIG. 1, magnetization versus temperature is represented for a temperature dependent magnetic field biasing layer for a storage medium. The biasing layer is preferably ferrimagnetic, and thus comprises first and second magnetic materials. The magnetic material components exhibit oppositely directed magnetizations indicated by lines 10 and 12 respectively in FIG. 1. At ambient or room temperature, the magnetizations of both component materials are at a maximum for normal operating temperature range, but are oppositely oriented. The magnetization of the second component 12 is shown above the temperature axis to indicate the relationship between the magnitudes of magnetization, but has an orientation opposite that of the first component. A biasing layer having two physically distinct layers will also provide the desired characteristics.

As the temperature of the layer rises, the magnetization of both component materials decreases, but at different rates. The magnetization of the layer is referred to as a net magnetization represented at 14 which is essentially the sum of the component magnetizations 10 and 12. At ambient temperature, the magnitude of the first component is greater than the magnitude of the second component resulting in a net magnetization oriented in the same direction as the first component 10. As the temperature of the layer increases to a compensation temperature indicated at 16 on the temperature axis, the absolute magnitudes of the component magnetizations are equal, and hence the net magnetization (line 14) is essentially zero. This occurs because the rate of decrease of the magnetization of the first component is greater than the decrease of magnetization of the second component.

As the temperature of the layer continues to rise, the magnitude of magnetization of the second component becomes greater than the magnitude of magnetization of the first component and the net magnetization becomes oriented in the direction of the second component, opposite that of the first. If the temperature were still further increased to or beyond the Curie temperature of the layer, the magnetization would become essentially zero.

Figure 2:
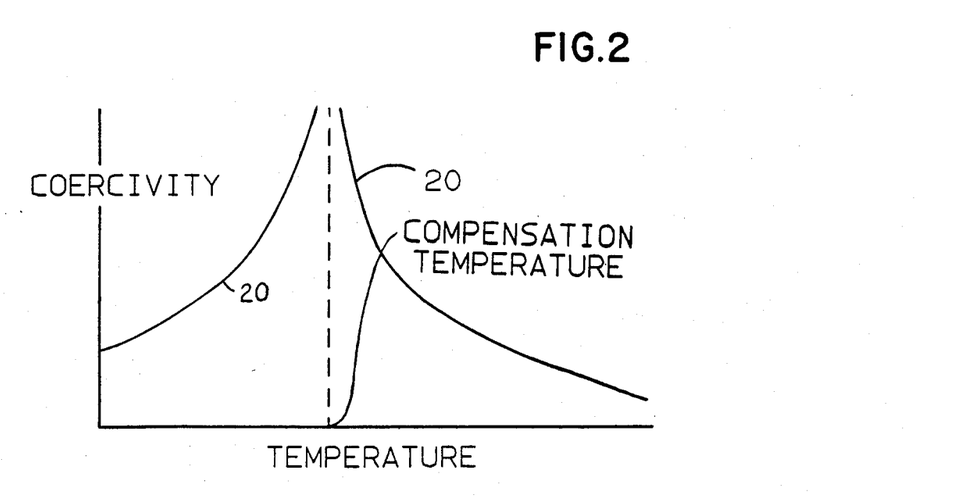
FIG. 2 is a graph of the coercivity of the biasing layer of FIG. 1 with respect to temperature.

The coercivity of the bias layer is represented by line 20 in FIG. 2. The coercivity increases from ambient temperature to reach a peak at the compensation temperature, and then decreases above the compensation temperature. The coercivity is zero at and beyond the Curie temperature.

The temperature dependent characteristics of the bias layer described with reference to FIGS. 1 and 2 have utilization in projecting a biasing field onto a data storage medium indicated generally at 30 in FIG. 3. Storage medium 30 comprises a first magnetic storage layer 32 coupled to a second biasing magnetic layer 34. Data is represented by domains of the magnetization orientation of the first and second layers. Data is written by heating areas of the medium 30 to create discrete domains of magnetization with an orientation representative of bits of data. The data is detected by observing the change in polarization of laser beams caused by the magnetized domains. The same laser is preferably used to read and write the magnetized domains. To reduce the effect of bias fields from neighboring domains of magnetization when creating domains, the distance between first magnetic storage layer 32 and second biasing magnetic layer 34 is preferably less than one-fourth of the radius of the written domain.

The discrete domains of magnetization which are formed during heating actually have different magnetic properties than that of the surrounding layer. This permits magneto-static coupling effects to project the necessary biasing field from the second layer 34. The discrete domains also present substantial energy barriers to undesired nucleation which could interfere with proper orientation of the magnetization.

Figure 4:
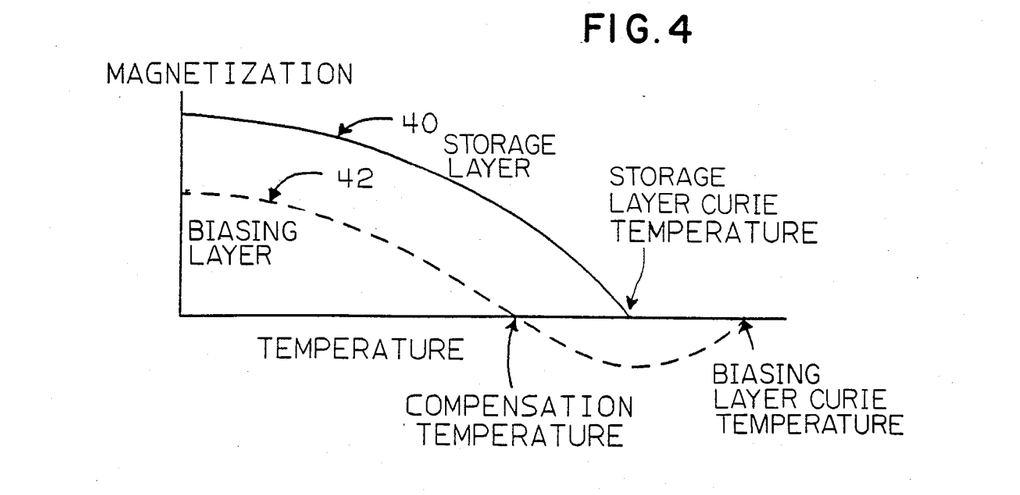
FIG. 4 is a graph of the net magnetization characteristics of the first and second layers of the storage medium of FIG. 3 with respect to temperature.

The temperature dependence of the net magnetization characteristics of the first and second layers are represented by lines 40 and 42 in FIG. 4. As an area is heated from ambient temperature, both magnetizations are initially oriented in the same direction and decrease with increasing temperature. As the temperature increases to and above the compensation temperature of the second layer 34, the orientation of the net magnetization of the second layer 34 changes direction. As the Curie temperature of the first layer 32 is reached its magnetization is essentially zero. The net magnetization of the second layer at this temperature is preferably at or near the maximum which can occur between its compensation temperature and Curie temperature. If the temperatures of the layers continue to increase to the Curie temperature of the second layer, the net magnetization of the second layer decreases in absolute magnitude until the magnetization becomes essentially zero at its Curie temperature. At this point, data would be lost.

Figure 3:
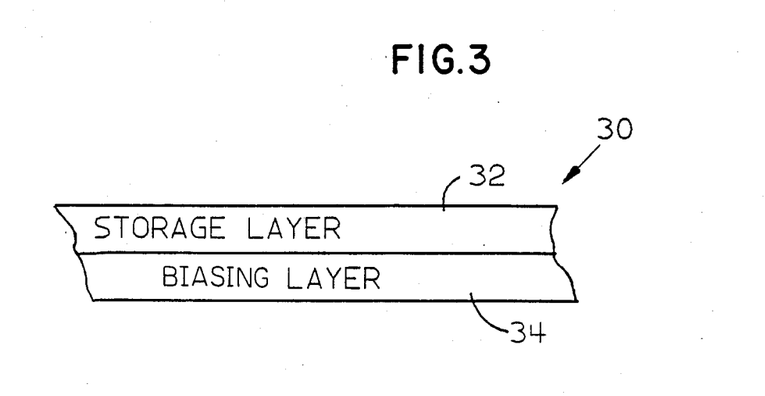
FIG. 3 is a part sectional view of a storage medium incorporating a first data storage layer and a second biasing layer.

Temperature cycling (heating and cooling) to obtain domains of magnetization in the storage medium of FIG. 3 representative of a desired bit pattern is indicated in FIGS. 5, 6, 7 and 8. In these Figures, magnetization of the first layer 32 is represented by lines located above the temperature axis and net magnetization of the second layer 34 is represented by lines located below the temperature axis. The lines have arrows indicating the orientation of the magnetizations.

Figure 5:
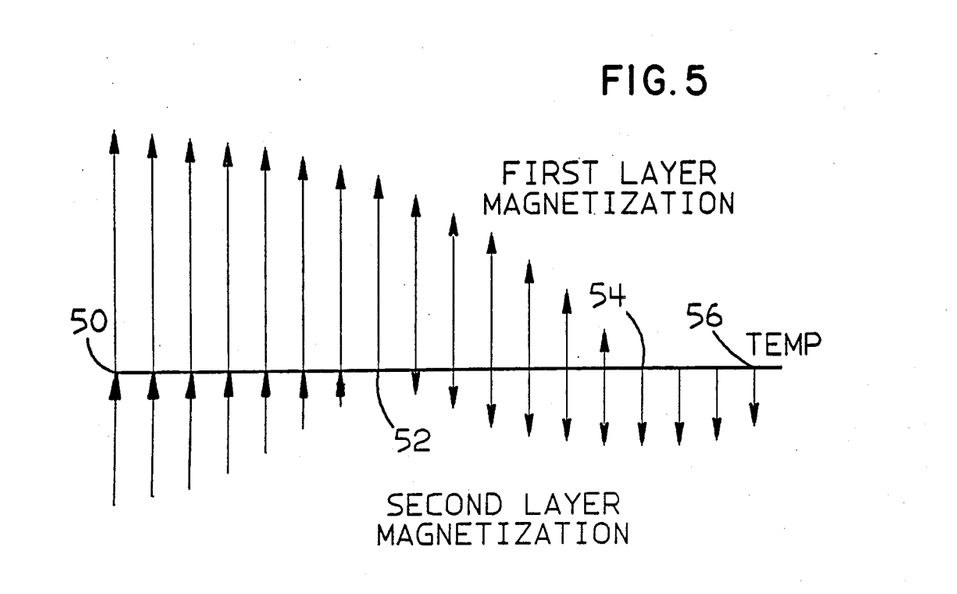
FIGS. 5, 6, 7, and 8 are graphs indicating net magnitudes and directions of magnetizations of the first and second layers with respect to temperature during successive heating and cooling cycles of the storage medium of FIG. 3.

In FIG. 5, at ambient temperature 50, the magnetizations of both layers are oriented up. As the temperature increases, the net magnetization of the second layer decreases to zero at the compensation temperature 52 of the second layer. Still further heating results in a noticeable decrease of the magnetization of the first layer, and an increase of the net magnetization of the second layer, but in the down direction. When the Curie temperature of the first layer is reached at 54, the magnetization of the first layer is zero, and the net magnetization of the second layer is preferably at a maximum for magnetization between the compensation temperature and Curie temperature for the second layer. Heating the medium a little further to a temperature 56 ensures that the Curie temperature of the first layer is attained, while remaining below the Curie temperature of the second layer.

Figure 6:
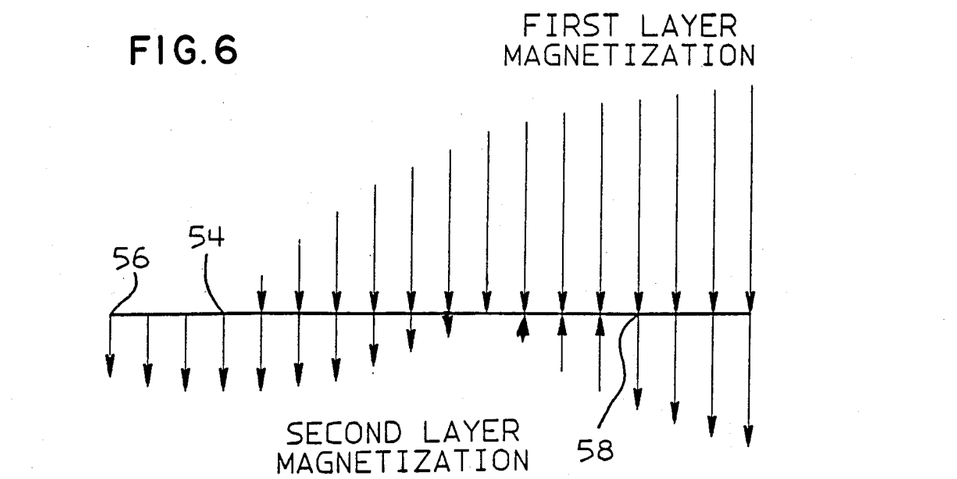

The cooling process which follows the heating process in FIG. 5 is indicated in FIG. 6. Cooling from temperature 56, back through the Curie temperature 54, the second layer magnetization influences the first layer to assume a magnetization orientation the same as the orientation of the net magnetization of the second layer, namely down. Thus, the magnetization of the first layer is flipped in orientation merely by heating the medium. As cooling continues past the compensation temperature of the second layer, the net magnetization of the second layer changes to the up direction, while the magnetization and coercivity of the first layer increases so that it is not influenced by the net magnetization of the second layer. At a temperature 58, which is below the compensation temperature of the second layer, the coercivity of the second layer is relatively low. At temperature 8, the magnetization of the first layer is large enough to change the net magnetization of the second layer to the down direction. When ambient temperature 50 is reached, both layers have a magnetization oriented in the down direction.

Figure 7:
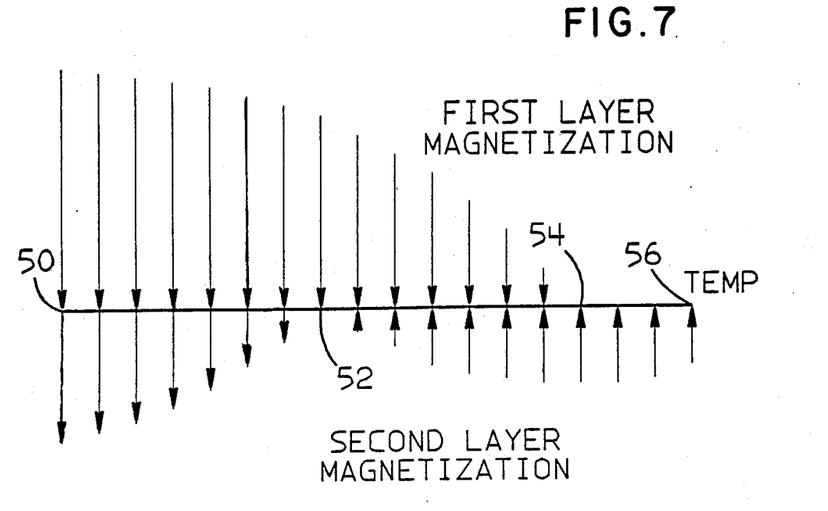
Figure 8:
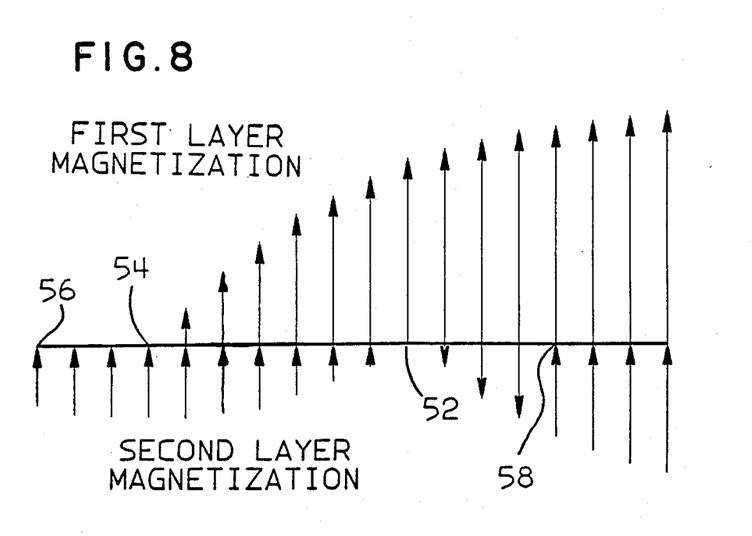

To flip the magnetization of a domain back to the up direction, the heating and cooling process is repeated as indicated in FIGS. 7 and 8. While heating, the magnetizations of both layers decrease, with the net magnetization of the second layer changing to the up direction above the compensation temperature 52. Again, the medium is heated to above the Curie temperature 54 of the first layer. As cooling begins in FIG. 8, the orientation of magnetization of the first layer becomes up, due to the projection of the magnetization of the second layer onto the first layer. Further cooling past the compensation temperature 52 results in the second layer magnetization flipping to the down direction, and then back up at temperature 58 because of the projection of magnetization of the first layer and the relatively low coercivity of the second layer at that temperature. At ambient temperature, the magnetizations of both layers are oriented in the up direction.

The flip-flopping of selected domains of magnetization is accomplished without the use of external forces other than the laser. The laser is used to heat the medium and in the detection of the orientation of the magnetic domains. No external forces are required to provide a switchable biasing field.

The discussion of FIGS. 5 through 8 assumes an equal temperature of all the layers of the medium. In practice, the layers will have a predictable temperature gradient when heated. Thus, the precise relationship between Curie and compensation temperatures depend on the heating and cooling characteristics of the layers as incorporated in the medium.

Figure 9:
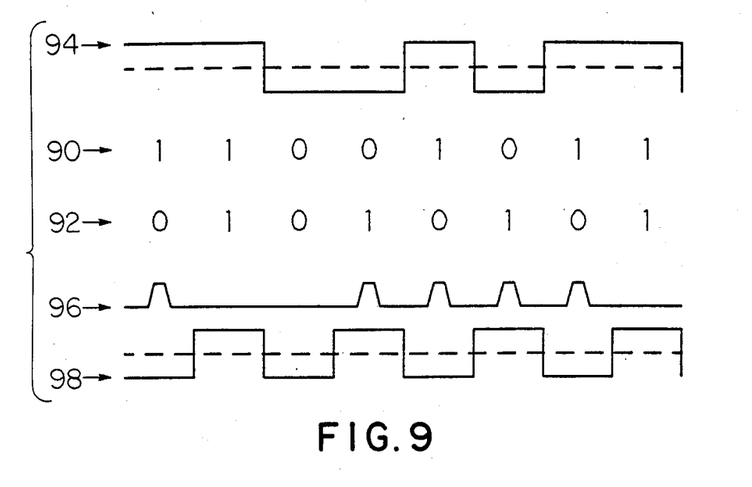
FIG. 9 is a timing diagram indicating magnetization of the first data layer during writing of data and laser bursts versus time.

In FIG. 9, a timing diagram indicates how domains of magnetization are changed from representing a first bit pattern 90 to represent a second bit pattern 92. Initial magnetization of the medium is represented by line 94. Magnetization in the up direction is representative of a 1 bit, and magnetization in the down direction is representative of a 0 bit. The initial state of a magnetic domain is detected near the fringe of a magnetic domain as the domain is moved towards the laser. If the domain needs to be changed, it is heated by the laser as close to the center of the domain as possible. Reading and heating, if necessary, preferably occur in one pass of the laser past the magnetic domain.

The first bit encountered in FIG. 9 is a 1, and the desired bit is a 0. A laser burst is indicated on a line 96 to change the domain from a 1 to a 0. The magnetization of the medium following the laser burst and cooling is indicated by a line 98. The second and third bits of the presently stored data and the desired data are the same, and hence no laser bursts are required. The fourth bit encountered is a 0 and the desired bit is a 1, thus a second laser burst, the same as the first burst occurs and the magnetization is changed as indicated on line 98. Similarly, the fifth, sixth, and seventh bits are changed by laser bursts.

Figure 10:
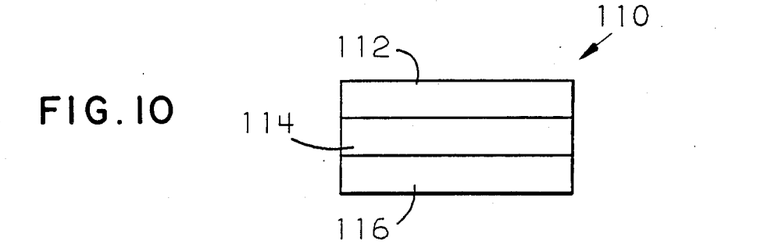
FIG. 10 is a part sectional view of a storage medium incorporating the first two layers of FIG. 3 with a third magnetic layer having a predetermined magnetization.

A further preferred embodiment of a storage medium is indicated generally at 110 in FIG. 10. A first storage layer 112, is essentially the same as storage layer 32 in FIG. 3. Similarly, a second biasing layer 114 is provided below the storage layer 112. The second biasing layer 114 and first storage layer cooperate much the same as the two layers in FIG. 3 when heated to below the Curie temperature of the second layer. A third layer 116 is located below the first two layers and contains a magnetization of predetermined, permanent orientation.

The third layer is preferably optically isolated from the first two layers such that writing of domains by flipping their magnetic field orientation occurs in much the same manner as the writing of domains in the medium in FIG. 2. The third layer provides a biasing field which is used to orient the magnetizations of the first and second layers in a predetermined orientation regardless of the orientation of the domains. When the first two layers are heated to a temperature above the Curie temperatures of both layers and cooled, they assume the orientation of the magnetization of the third layer. The third layer magnetization preferably increases when heated incident to the heating of the first and second layers. As the second layer cools below its Curie temperature, it assumes the magnetic field orientation of the third layer, but then changes orientation as it cools below its compensation temperature. The same flipping of the second layer occurs below the compensation temperature of the second layer as described above due to the field effects of the first layer. Thus an erase capability is provided without the use of external biasing sources. With the magnetization of the first two layers known, it is not necessary to read domains, before writing domains with new data. This eliminates the need for precision timing when trying to read the fringe of a domain and then switch functions and write close to the center of the domain. The optical isolation substantially prevents the laser beam from being significantly polarized by the third layer which may have an orientation opposite the domain of data to be read.

Figure 11:
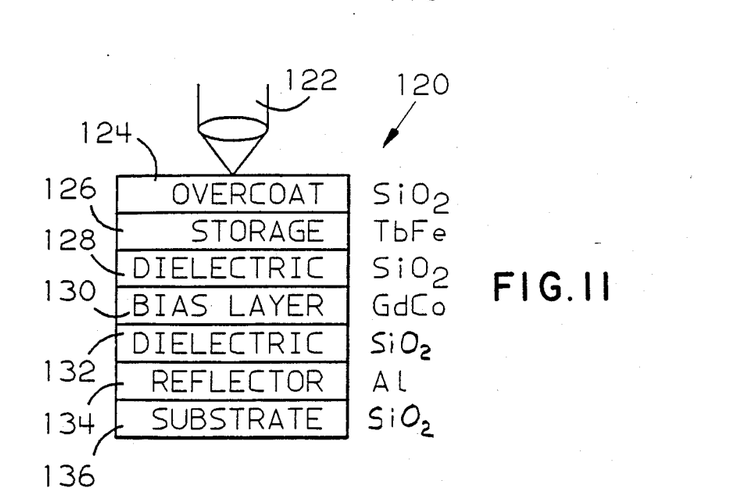
FIG. 11 is a part sectional view of a multilayer storage medium incorporating a magnetic field biasing layer in accordance with the present invention.

A detailed block diagram of the storage medium of FIG. 3 is indicated generally at 120 in FIG. 11. A laser 122 or similar source of heat emits radiation toward a first protective layer 124 such as SiO2. A second storage layer 126 beneath the first layer 124 from the laser 122 is preferably formed of a magnetic material such as TbFe. A dielectric third layer 128, preferably SiO2, couples the second storage layer 126 to a fourth biasing layer 130. Biasing layer 130 is preferably formed of a ferrimagnetic material such as GdCo and has the characteristics described in the text above with respect to the second layer in FIG. 3.

A fifth dielectric layer 132 provides a desired amount of thermal isolation for a sixth reflective layer 134. The fifth layer is again preferably SiO2 and serves to control the transfer of heat out of the biasing layer 130 into the reflective layer 134. The sixth layer is preferably formed of aluminum or other material which has a high reflectivity to assist in detecting the orientations of the domains of magnetization of the second and fourth layers. The sixth layer is formed on a common substrate 136 such as glass.

The medium 120 has one preferred use in hard disk files, where the medium is formed in a disk shape and rotated about its axis to create movement with respect to a source of radiation used to heat selected portions of the medium to create domains of magnetization representative of data. Other uses, such as in a tape form, are apparent to those skilled in the art.

Since the coercivity of the magnetic layers selected in the present invention is relatively high at ambient temperature, and the Curie temperatures are also relatively high, very stable domains of magnetization are created. The fact that no slowly switchable external fields need be switched enables fast flipping of the domains. A further benefit is realized in that both the magnetic storage layer and the bias layer have the same magnetic orientations at ambient temperature which is the normal temperature at which the orientations are detected. Thus, a beam of light used to detect the orientations by change in polarization of the light is polarized by both layers, enhancing detection of the change in polarization if the thickness and spacing of the layers are chosen correctly, as is well known in the art.

The invention further takes advantage of the benefits provided by optical/magnetic recording and reading in general. These benefits include reduction in the need for extensive read/write head aerodynamic design, because the writing and detecting means need not not be extremely close to the medium. Less sensitivity to to electromagnetic noise is a further benefit. Also, by use of a laser with diffraction limited focussing systems, very small domains of magnetization are created permitting an increase in data density compared to media requiring external magnetic biasing fields. Although if too small a domain is created, fringe effects may be great enough to affect the reading and writing of domains. A further benefit of a self biasing medium is the size reduction of the size of storage devices incorporating the present invention by eliminating large magnetic field sources, or a potential reduction in the complexity of the data writing head which may have been used to provide a biasing field.

What is claimed is:

1. A thermally written magnetic data storage medium for retaining domains of desired magnetic field orientations representative of the data comprising:
   data layer means for retaining the domains having desired magnetic field orientations; and
   bias layer means coupled to the data layer means for providing a biasing field as a function of the temperature of the bias layer means for obtaining the domains of desired magnetic field orientations in the data layer.

2. The data storage medium of claim 1 wherein the desired magnetic field orientations of the data layer means are changeable as a function of the biasing field from the bias layer means.

3. The data storage medium of claim 1 wherein the bias layer means has a magnetization with an orientation in a first direction below a first temperature and an orientation in a second direction at temperatures above the first temperature.

4. The data storage medium of claim 3 wherein the data layer means has a Curie temperature above the first temperature.

5. The data storage medium of claim 1 wherein the bias layer means comprises a ferrimagnetic material having a first and a second component with magnetizations of substantially opposite orientation.

6. The data storage medium of claim 5 wherein the first component magnetization decreases with increasing temperature faster than the second component magnetization decreases.

7. The data storage medium of claim 6 wherein the first component magnetization is greater than the second component magnetization below a compensation temperature and the second component magnetization is greater than the first component magnetization above the compensation temperature such that the net magnetization orientation below the compensation temperature is opposite to the net magnetization above the compensation temperature.

8. The data storage medium of claim 7 wherein the Curie temperature of the bias layer means is above the Curie temperature of the data layer means and the magnetization of the data layer means decreases faster with increasing temperature above the compensation temperature than below the compensation temperature of the bias layer means.

9. The data storage medium of claim 8 wherein the coercivity of the bias layer means is low at a second temperature below the compensation temperature and the magnitude of the magnetic field at the bias layer means projected from the data layer means is large compared to the magnitude of the coercivity of the bias layer means at the second temperature.

10. The data storage medium of claim 9 wherein the net magnetization of the bias layer means conforms to the direction of magnetization of the data layer means at the second temperature.

11. The data storage medium of claim 10 wherein heating a portion of the medium from an ambient temperature to a third temperature above the Curie temperature of the data layer means, but below the Curie temperature of the bias layer means and cooling the medium back to ambient temperature causes the magnetization of the data layer means to change orientation.

12. The data storage medium of claim 11 wherein the bias layer means changes orientation consistent with the change in orientation of the magnetization of the data layer when the medium cools from a fourth temperature which is less than the compensation temperature of the bias layer means to ambient temperature.

13. The data storage medium of claim 1 and further comprising a third magnetic layer means for providing a biasing field having a known orientation.

14. The data storage medium of claim 13 wherein the bias layer means has a magnetization with an orientation in a first direction below a first temperature and an orientation in a second direction at temperatures above the first temperature.

15. The data storage medium of claim 14 wherein the data layer means has a Curie temperature above the first temperature.

16. The data storage medium of claim 15 wherein the third layer means has a Curie temperature above the Curie temperatures of the data and bias layer means such that when the medium is heated to above the Curie temperatures of the data and bias layer means, but below the Curie temperature of the third layer, the third layer retains its known orientation of magnetization and projects a greater magnetic field onto the data and bias layers than in an unheated state.

17. The data storage medium of claim 14 wherein heating of the medium such that the temperature of the data layer means is greater than its Curie temperature, the temperature of the bias layer means is greater than its Curie temperature and the temperature of the third layer is less than its Curie temperature forces the magnetizations of the data and bias layer means to the same direction as the known direction of magnetization of the third layer upon cooling of the medium.

18. The data storage medium of claim 14 wherein the bias layer means has a compensation temperature at which the orientation of the net magnetic field changes and wherein heating of the medium such that the temperature of the data layer means is greater than its Curie temperature and the temperature of the bias layer means is less than its Curie temperature but greater than its compensation temperature forces the magnetization of the data layer means to orient in the same direction as the orientation of the net magnetization of the bias layer means between the bias layer means' compensation and Curie temperature upon cooling of the data layer means below its Curie temperature.

19. Apparatus for providing a biasing magnetic field for a magnetic storage device having domains of magnetization representative of data, the apparatus, comprising:
   a ferrimagnetic layer having a net magnetization with an orientation in a first direction when such layer is at a temperature below its compensation temperature and a net magnetization with an orientation in a second direction different from the first direction at a temperature above its compensation temperature, but below its Curie point temperature, said layer providing the biasing magnetic field for establishment of the domains of magnetization.

20. The data storage medium of claim 19 wherein the ferrimagnetic layer comprises a ferrimagnetic material having a first and a second component with magnetizations of substantially opposite orientation.

21. The data storage medium of claim 20 wherein the first component magnetization decreases with increasing temperature faster than the second component magnetization decreases.

22. The data storage medium of claim 21 wherein the first component magnetization is greater than the second component magnetization below a compensation temperature and the second component magnetization is greater than the first component magnetization above the compensation temperature such that the net magnetization orientation changes on either side of the compensation temperature.

23. A method of writing data on an opto-magnetic storage medium having a first layer for retaining domains of magnetization having orientations representative of data and a second biasing layer having a compensation temperature less than, and a Curie temperature greater than the Curie temperature of the first layer, comprising the steps of:
heating a selected portion of the medium to a temperature greater than the Curie temperature of the first layer, but less than the Curie temperature of the second layer; and
cooling the selected portion of the medium to a temperature substantially less than the compensation temperature of the second layer such that the orientation of magnetization of the portion of the first layer is changed in a desired manner.

24. The method of claim 23 wherein repeating the steps of heating and cooling returns the orientation of magnetization of the portion of the first layer to its original orientation.

25. The method of claim 23 wherein the second layer has domains of magnetization corresponding to respective domains of magnetization of the first layer and being oriented in the same direction as the domains of the first layer before heating and after cooling.

26. The method of claim 25 wherein the orientation of net magnetization of the second layer flips to an orientation substantially opposite the orientation of magnetization of the first layer as the medium is heated through the compensation temperature of the second layer.

27. The method of claim 26 wherein the orientation of magnetization of the first layer assumes the flipped orientation of the second layer magnetization during cooling of the medium from the Curie temperature of the first layer.

28. The method of claim 26 wherein upon further cooling of the medium past the compensation temperature of the second layer, the coercivity of the second layer becomes low enough such that the net magnetization of the second layer assumes the same orientation as the magnetization of the first layer.

29. A method of returning magnetization of a self biasing magnetic medium to a predetermined direction, the medium having a first layer for retaining domains of magnetization representative of data, a second ferrimagnetic layer for providing a biasing magnetic field for obtaining the domains of magnetization in the first layer, and a third layer for providing a magnetic biasing field of predetermined direction, comprising the steps of:
heating the first and second layers to a temperature above both the Curie temperature of the first layer and the Curie temperature of the second layer to reduce their magnetizations to substantially zero; and
cooling the first and second layers to a temperature below the compensation temperature of the second layer and the Curie temperatures of the first and second layers such that the orientation of magnetization of the first and second layers is in the predetermined direction.

* * * * *